United States Patent [19]

Golden

[11] Patent Number: 4,653,356

[45] Date of Patent: Mar. 31, 1987

[54] MULTI-PURPOSE HAND TOOL

[76] Inventor: Arthur Golden, 32932 Danapoplar St., Dana Point, Calif. 92629

[21] Appl. No.: 669,772

[22] Filed: Nov. 9, 1984

[51] Int. Cl.⁴ .............................................. B25B 23/00
[52] U.S. Cl. ..................................... 81/57.14; 81/490; 81/177.4; 81/439; 81/57.5
[58] Field of Search .................... 81/437–440, 81/57.11, 57.14, 57.22, 57.37, 57.5, 177.4, 180.1, 177.1, 490; 7/167, 168, 158, 104, 138, 165, 901, 170; 145/63; 173/163

[56] References Cited

U.S. PATENT DOCUMENTS

| | | | |
|---|---|---|---|
| 910,789 | 1/1909 | Cunningham | 81/437 X |
| 966,529 | 8/1910 | Cunningham | 81/57.5 |
| 2,251,148 | 7/1941 | Masland | 7/138 X |
| 2,679,770 | 6/1954 | Carter et al. | 173/163 |
| 2,765,013 | 10/1956 | Pedersen | 145/63 |
| 3,006,395 | 10/1961 | Dye | 7/165 X |
| 4,235,269 | 11/1980 | Kraus | 81/177.4 X |
| 4,356,852 | 11/1982 | Smith | 81/437 X |
| 4,399,723 | 8/1983 | Marlean | 81/437 |
| 4,467,676 | 8/1984 | Ilceda et al. | 81/177.1 X |
| 4,572,038 | 2/1986 | Graham | 81/490 X |

Primary Examiner—Frederick R. Schmidt
Assistant Examiner—Debra S. Meislin
Attorney, Agent, or Firm—Charles C. Logan, II

[57] ABSTRACT

A multi-purpose hand tool having novel structure which allows it to partially function in the manner of a revolver. It has a ten or twelve chamber cylinder which revolves and holds various sizes of screwdriver, Phillips head drivers, Allen wrenches, sockets, screw starters, etc. The tool has a primary shaft that is journaled within a tubular sleeve and the shaft has a handle mounted on its one end and a male socket head formed on its forward end. The drive shaft may be sequentially driven forward to engage one of the tool heads in one of the chambers of the cylinder with further forward motion causing the tool head to exit the front of the chamber where it can be used to tighten or loosen a fastener. The drive shaft can be operated by hand, hand ratchet, an electric drill with an adapter, or by a battery powered electric motor mounted in the handle housing. To change tool heads, it is merely necessary to withdraw the drive shaft thereby depositing the tool head in its cylinder chamber and rotating the cylinder to the chamber containing the next desired tool head. the operation of moving the drive shaft forwardly again will result in the next tool head being positioned on the forward end of the drive shaft. A hollow support handle may be used to store additional tool heads and adapters therefore. An auxiliary handle having flashlight structure can also be attached to the housing of the tool.

14 Claims, 6 Drawing Figures

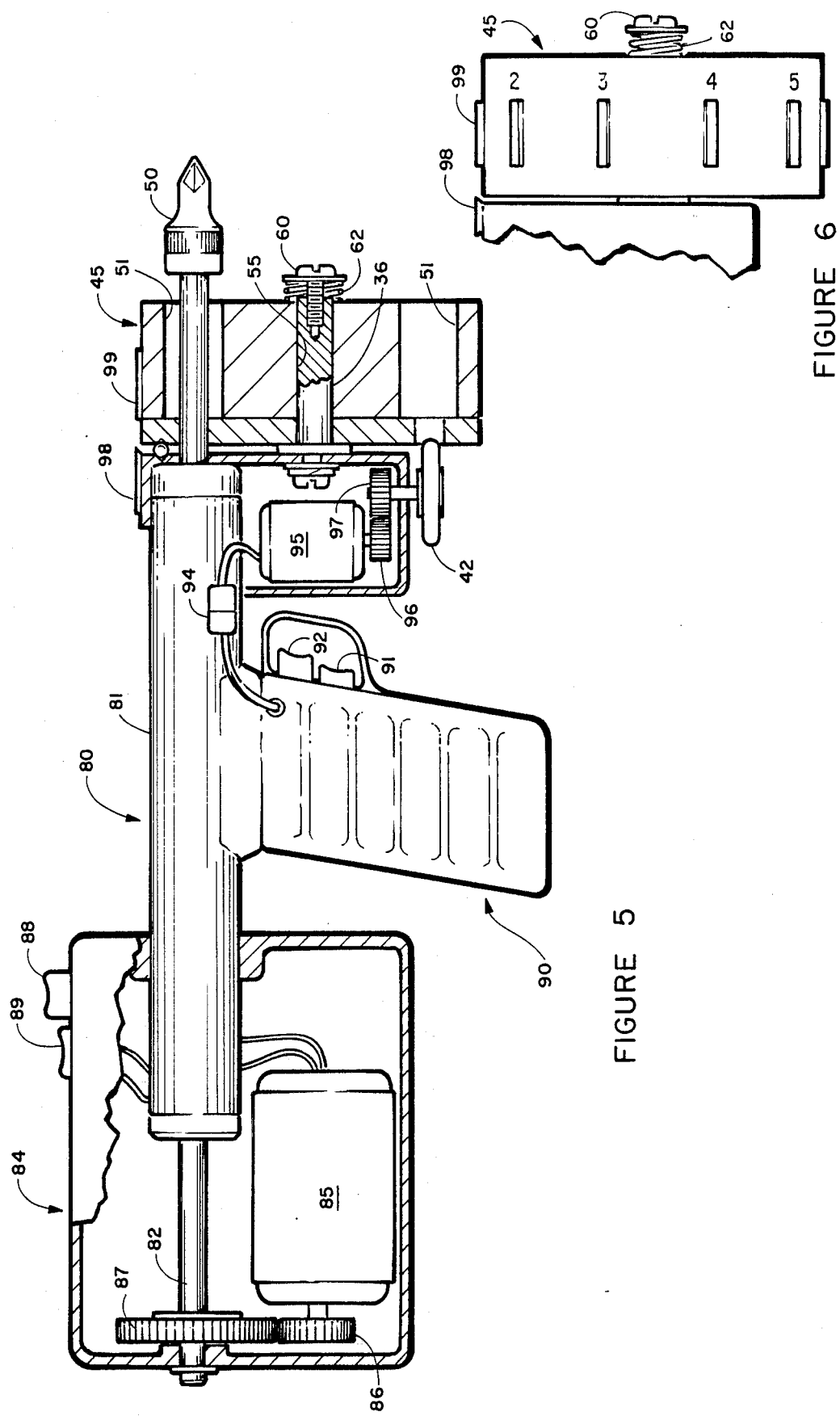

MULTI-PURPOSE HAND TOOL

BACKGROUND OF THE INVENTION

The invention relates to a hand tool used to tighten and loosen various types of fasteners. In the past hand tools generally have been single function tools such as a screwdriver, or an Allen wrench. The advent of socket wrenches has allowed for the use of a single wrench to be used with multiple sized sockets. A drawback to this however remains in the fact that it is still necessary to individually remove each female socket, place it back in its storage case, take a new female socket and attach it to the end of the socket wrench.

A few hand tools have been developed with multiple tool heads permanently attached to the fingers of a turret which is rotatable to allow each tool head to travel to a work position. An example of such a structure is illustrated in the Cunningham patents, U.S. Pat. Nos. 910,789 and 966,529. These tools have been primarily used in the watchmaking and repairing trade and have not been practical for general assembly work or repair work.

Another form of compact combination tool set is illustrated in U.S. Pat. No. 4,399,723. The inventor here has stacked a number of tool heads and also provided structure of their lateral sides to provide additional ways of using a torqueing action.

To the present, however, no one has devised a combination multi-purpose hand tool which allows a plurality of tool heads to be carried in a plurality of chambers in a cylinder which may be rotated to align the desired tool head with the drive shaft of the hand tool.

It is an object of the invention to provide a novel multi-purpose hand tool having capabilities never previously available in the present state of the art hand tools.

It is also an object of the invention to provide a novel multi-purpose hand tool which has the flexibility to be operated by hand, hand ratchet, electric drill with an adapter, or a battery powered drive motor housed on the drive shaft.

It is another object of the invention to provide a novel multi-purpose hand tool having handles that may function as a storage chamber or as a flashlight.

It is an additional object of the invention to provide a novel multi-purpose hand tool which permits efficient and rapid changes of drivers and sockets thereby saving time and frustration.

It is a further object of the invention to provide a novel multi-purpose hand tool which allows the tool heads to be removed as desired from the chambers of the revolving cylinder.

SUMMARY OF THE INVENTION

Applicant's novel hand tool has been designed to be a multi-purpose tool. Any variety of tool heads in the form of screwdrivers, Phillips head drivers, Allen wrenches, sockets, screw starters, etc., can be utilized with this tool. With its capacity of ten or twelve recess chambers in the cylinder, the user is able to preload the hand tool with most of the tool heads that he would be generally using in performing different assembly or disassembly operations. This permits efficient and rapid changes of the tool heads thereby saving time and frustration.

The multi-purpose hand tool has a primary drive shaft that is journalled within a sleeve thereby allowing both rotational movement and reciprocating movement of the drive shaft within the sleeve. A tubular handle is attached to one end of the drive shaft and the other end has a male socket head formed thereon. A cylinder and roller bracket is attached to the front end of the hand tool and a cylinder is rotatably supported by the cylinder and roller bracket.

The cylinder has a plurality of recess chambers formed in its front face that align with apertures in its rear face. The recess chambers have longitudinally extending axes that are parallel to each other. These recesses have their axes on a common radius with the radius being substantially equal to the lateral distance from the longitudinal axis of the primary drive shaft to the longitudinal axis of the cylinder. A female socket having a tool head is positioned in each of the recess chambers of the cylinder. They are nominally held in position by the rear half of the cylinder which is in the form of a rear disc of magnetic material. Another method for nominally capturing the female sockets in the recess chambers of the cylinder would be to have spring loaded balls mounted in bore holes that extend radially inwardly from the circumference of the cylinder into the recess chambers. Adapters could be substituted for the tool heads in some of the recess chambers to allow for larger sized sockets to be used thus giving additional versatility to the tool.

To operate the hand tool, the handle is pushed forward over the sleeve thereby causing the drive shaft to enter one of the aligned apertures in the rear of the cylinder. The continued forward motion of the drive shaft causes the male socket head at its forward end to engage the female socket end of the tool head driver found in the recess chamber of the cylinder. After the tool head driver has traveled outwardly a predetermined distance from the cylinder, the handle may be turned either manually or mechanically to use the driver to tighten or loosen a fastener. To remove the driver tool head, it is merely necessary to withdraw the handle rearwardly which will deposit the driver tool head in its proper recess chamber. At this point the cylinder may be rotated to a new recess chamber having a driver tool which is to be used next. The roller mounted on the cylinder and roller bracket travels along the back surface of the cylinder and drops into the aperture at the back of the cylinder diametrically opposite the recess chamber from which the desired driver tool is to be mounted on the drive shaft.

A support handle is detachably secured to the side of the sleeve of the hand tool. The support handle may be formed with a storage handle therein for housing various adapters or socket. An alternative handle has a flashlight structure and this can be detachably secured to the sleeve of the hand tool in order to illuminate the work area.

DESCRIPTION OF THE DRAWINGS

FIG. 5 is a side elevation view of an alternative embodiment of the novel multi-purpose hand tool having portions broken away or in section for clarity; and FIG. 6 is a side elevation view of the revolver-like cylinder.

DESCRIPTION OF THE PREFERRED EMBODIMENT

Figure 1:
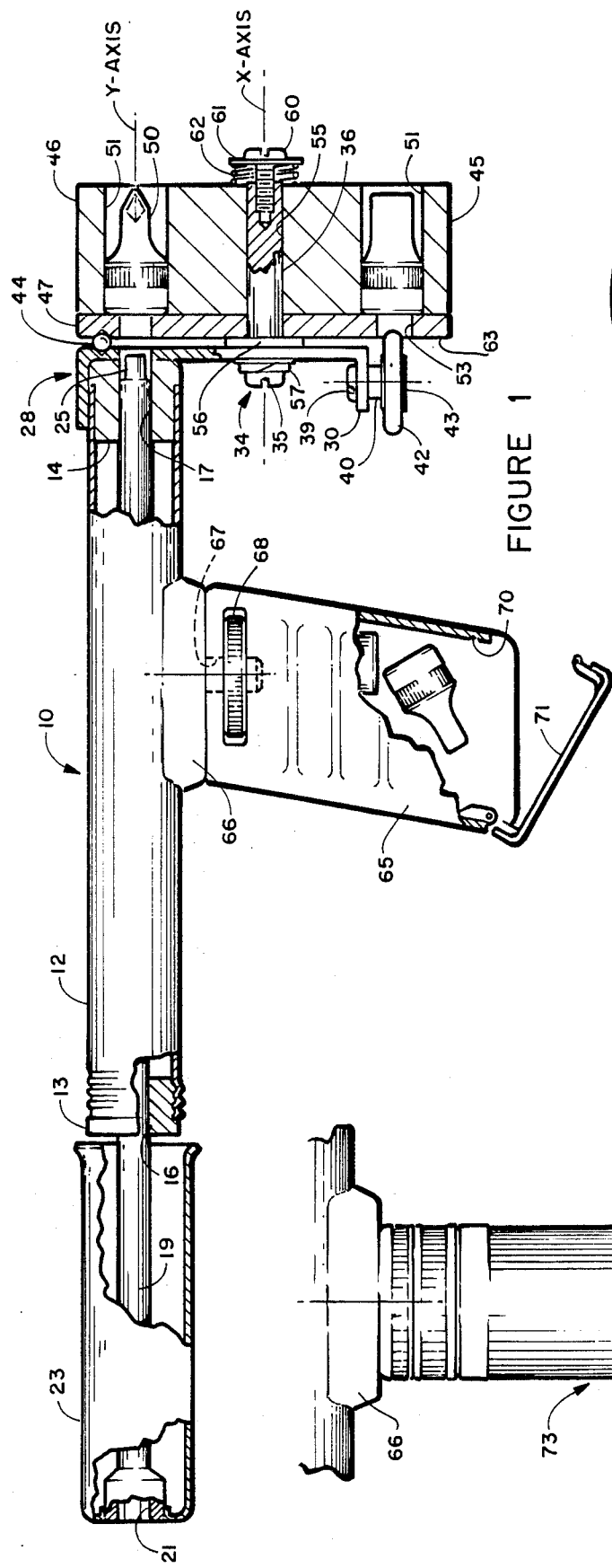
FIG. 1 is a side elevation view of applicant's novel multi-purpose hand tool having portions broken away for clarity.
Figure 2:
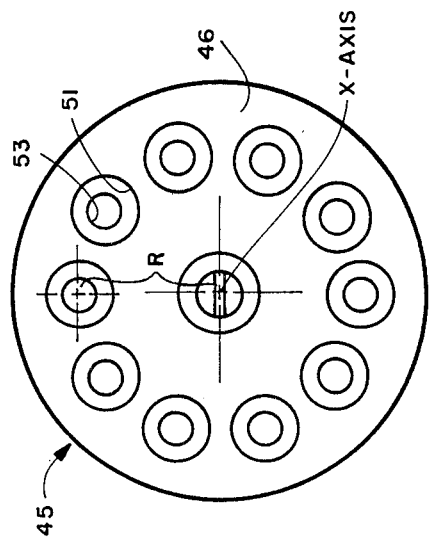
FIG. 2 is an end elevation view of the revolver-like cylinder.
Figure 4:
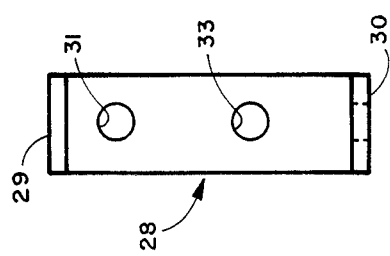
FIG. 4 is a top plan view of the cylinder and roller bracket.
Figure 3:
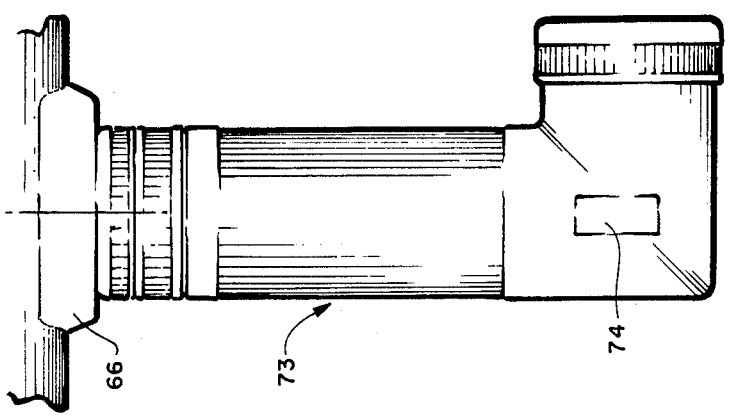
FIG. 3 is a side elevation view of the flashlight attachment handle.

Applicant's novel multi-purpose hand tool will now be described by referring to FIGS. 1-4 of the drawings. The multi-purpose hand tool is generally designated numeral 10. It has a tubular sleeve 12 having a cap 13 closing its rear end and a bushing 14 closing its forward end. These end members have respective apertures 16 and 17 through which pass a drive shaft 19. Drive shaft 19 is journaled in apertures 16 and 17 and may also be journaled in additional bearings within the hollow tubular sleeve 12.

A female socket 21 is formed on the rear end of drive shaft 19 and it forms a recess in the tubular handle 23, whose inner diameter is greater than the outside diameter of sleeve 12 so that it may telescope thereover. The front end of drive shaft 19 has a male socket head 25 formed thereon.

A cylinder and roller bracket 28 has its one end attached to the forward end of tubular sleeve 12 and it extends laterally therefrom. Bracket 28 has upstanding arm portion 29 on its one end and an upstanding arm portion on its other end. An aperture 31 is aligned with the longitudinally extending y-axis of drive shaft 19. A second aperture 33 in bracket 28 receives a bolt 34 having a head 35 and a shank portion 36. The function of bolt 34 will be described later.

A pin 39 having a shaft 40 passes through an aperture in upright arm portion 30 and it has a roller 42 captured thereon by a retaining clamp 43. Roller 42 has a ball bearing race that allows it to rotate freely.

A revolver-like cylinder 45 is formed from a front disc 46 and a rear disc 47. Rear disc 47 is made of a magnetic material to detachably hold the driver tool 50 in the recess chamber 51 formed in the front face of cylinder 45. The axes of recess chambers 51 are formed on an arc having a radius R. The rear face of the cylinder 45 has a plurality of apertures 53 that are aligned with the recess chambers 51. It is through these apertures 53 that the male socket head 25 of the drive shaft 19 passes.

The structure for revolving the cylinder 45 relies on the bolt 34 whose shank portion 36 passes through bore hole 55. Washers 56 and 57 aid in allowing the cylinder to smoothly rotate about shank portion 36. A screw 60 is threaded into the forward end of bolt 34 and it has a washer 61 that captures a spring 62 between itself and the front surface of front disc 46. As the cylinder 45 is rotated, roller 42 will periodically drop into apertures 53 and then roll up onto the flat rear surface 63 of rear disc 47. This causes the cylinder to be pushed forwardly which in turn causes spring 62 to be compressed. When the roller 42 drops into the next aperture 53 the spring 62 is allowed to expand again. This structure aids in the positive alignment of the apertures 53 with the male socket head 25 of the drive shaft 19. A ball bearing 44 aids to allow cylinder 45 to rotate more easily.

A support handle 65 is detachably connected to the lateral side of sleeve 12. This is accomplished by the structure of mounting base 66 which has an externally threaded stud 67 extending outwardly therefrom. A tightening nut 68 can be tightened or loosened to secure or remove support handle 65. The interior of support handle 65 has a hollow chamber 70 for storing various adapters and sockets. This chamber 70 is closed by a hinged cover 71.

An alternative support handle 73 has structure in the form of a flashlight. It has a switch 74 on its side. It would also be attached to the mounting base 66 in a similar manner to support handle 65.

An alternative embodiment of the multi-purpose hand tool is illustrated in FIG. 6 and is generally designated numeral 80. It has a tubular sleeve 81 and a drive shaft 82. A removeable power pack 84 is connected to drive shaft 82. It has a reversible electric DC motor 85 therein which drives a gear train consisting of gears 86 and 87. A push button switch 88 and a shaft forward or reverse switch 89 are positioned on the top of the housing. Multi-purpose hand tool 80 also has a removeable battery power pack handle 90 having a cylinder forward/reverse switch 91 and a toggle trigger switch 92. Voltage input terminals plug 94 connect the power to a minature reversible electric DC motor 95. Motor 95 drives a gear train consisting of gears 96 and 97 to rotate roller 42 which causes revolver-like cylinder 45 to rotate. To aid in indexing the recess chambers 51 to their proper position with drive shaft 82, alignment markers 98 and 99 are formed on adjacent members 81 and 45 respectively. The operation of hand tool 80 is substantially the same as that of hand tool 10 with the exception that their is a motor drive to replace the previous manual operation.

What is claimed is:
1. A multi-purpose hand tool comprising:
   an elongated primary tubular sleeve having a predetermined length, said tubular sleeve having a front end and a rear end;
   an elongated primary shaft having a longitudinally extending axis and being of a predetermined length that is greater than the length of said tubular sleeve, said primary shaft having a front end and a rear end;
   means for supporting said shaft within said primary tubular sleeve so that the primary shaft may rotate and travel axially whenever so desired;
   a support member having a top end and a bottom end, the top end of said support member being attached to the forward end of said primary tubular sleeve with said support member extending laterally therefrom; a cylinder having a longitudinally extending axis, said cylinder having a front face and a rear face;
   means for rotatably connecting said cylinder to said support member about said cylinder's longitudinal axis intermediate the top and bottom end of said support member, said cylinder's axis being parallel to the axis of said primary tubular sleeve;
   said cylinder having a plurality of recesses formed in its front face that align with apertures in said rear face, said recesses having longitudinally extending axes that are parallel to each other, said recesses having their axes on a common radius, said radius being substantially equal to the lateral distance from the longitudinal axis of said primary shaft to the axis of said cylinder;
   means for detachably securing a female socket having a tool head in each recess of said cylinder; and
   means for positively positioning the axes of the apertures in the rear face of said cylinder in alignment with the longitudinal axis of said primary shaft when said cylinder is rotated comprising a roller having an axis substantially perpendicular to the axis of said cylinder, means for rotatably mounting said roller to said support member and adjacent the bottom end of said support member and adjacent the rear face of said cylinder so that said roller travels along the rear face of said cylinder as it is rotated about its axis, a portion of the circumference of said roller being captured sequentially in said respective apertures on the rear surface of said cylinder to positively align a desired female socket with primary shaft.

2. A multi-purpose hand tool as recited in claim 1 wherein said primary shaft has a socket-engaging head formed on its front end.

3. A multi-purpose hand tool as recited in claim 1 wherein said primary shaft has a female socket on its rear end.

4. A multi-purpose hand tool recited in claim 1 wherein said primary shaft has a handle formed on its rear end.

5. A multi-purpose hand tool as recited in claim 4 wherein said handle is formed from a secondary tubular sleeve whose inner diameter is greater than the outer diameter of said primary tubular sleeve.

6. A multi-purpose hand tool as recited in claim 1 further comprising a support handle extending laterally from said primary tubular sleeve.

7. A multi-purpose hand tool as recited in claim 6 wherein said support handle has means for detaching said handle from said primary tubular sleeve.

8. A multi-purpose hand tool as recited in claim 6 wherein said support handle has a chamber formed therein for removeably receiving a plurality of tool heads.

9. A multi-purpose hand tool as recited in claim 6 wherein said support handle is in the form of a flashlight.

10. A multi-purpose hand tool as recited in claim 1 wherein the diameter of the apertures in the rear face of said cylinder is less than the diameter of the female sockets having a tool head.

11. A multi-purpose hand tool as recited in claim 1 wherein said means for detachably securing the female sockets having a tool head in the recesses of said cylinder comprises said cylinder being formed from a front disc and a rear disc, said rear disc being formed of magnetic material that captures said female sockets.

12. A multi-purpose hand tool as recited in claim 1 further comprising a motor and drive means connecting said motor to said primary shaft.

13. A multi-purpose hand tool as recited in claim 12 wherein said motor and drive means are located in a housing telescopically connected to said primary tubular sleeve.

14. A multi-purpose hand tool as recited in claim 1 further comprising a motor and drive means for rotating said cylinder.

* * * * *